US010735646B2

(12) United States Patent
Ling et al.

(10) Patent No.: US 10,735,646 B2
(45) Date of Patent: Aug. 4, 2020

(54) IMAGE-PROCESSING MICROPROCESSOR FOR SUPPORTING AN APPLICATION PROCESSOR

(71) Applicants: Zhengyuan Ling, Fuzhou (CN); Yongle Lai, Fuzhou (CN); Huan Jian, Fuzhou (CN); Shengqin Zhang, Fuzhou (CN); Song Du, Fuzhou (CN); Jiang Han, Fuzhou (CN); Xinquan Ling, Fuzhou (CN)

(72) Inventors: Zhengyuan Ling, Fuzhou (CN); Yongle Lai, Fuzhou (CN); Huan Jian, Fuzhou (CN); Shengqin Zhang, Fuzhou (CN); Song Du, Fuzhou (CN); Jiang Han, Fuzhou (CN); Xinquan Ling, Fuzhou (CN)

(73) Assignee: Rockchip Electronics Co., Ltd., Fuzhou, Fujian (CN)

( * ) Notice: Subject to any disclaimer, the term of this patent is extended or adjusted under 35 U.S.C. 154(b) by 107 days.

(21) Appl. No.: 15/716,472

(22) Filed: Sep. 26, 2017

(65) Prior Publication Data

US 2018/0089808 A1 Mar. 29, 2018

(30) Foreign Application Priority Data

Sep. 26, 2016 (CN) .......................... 2016 1 0848517
Nov. 18, 2016 (CN) .......................... 2016 1 1015062

(51) Int. Cl.
*H04N 5/232* (2006.01)
*G06T 1/20* (2006.01)
(Continued)

(52) U.S. Cl.
CPC ........... *H04N 5/23227* (2018.08); *G06T 1/00* (2013.01); *G06T 1/0007* (2013.01); *G06T 1/20* (2013.01);
(Continued)

(58) Field of Classification Search
CPC ............. H04N 5/2258; H04N 5/23227; H04N 5/23203; H04N 5/23206; H04N 5/232061;
(Continued)

(56) References Cited

U.S. PATENT DOCUMENTS

2003/0011691 A1* 1/2003 Nagao .................... H04N 5/232 348/231.99
2006/0139460 A1* 6/2006 Ozaki .................... H04N 5/232 348/222.1

(Continued)

*Primary Examiner* — Daniel M Pasiewicz

(57) ABSTRACT

An image-processing unit for an electronic device is disclosed. The image-processing unit may include a digital signal processor (DSP), a first control interface configured for receiving an AP-instruction from an application processor (AP) external to the image-processing unit, and a second control interface configured for transmitting an intermediary-instruction generated by DSP based on the AP-instruction. The image-processing unit may further include a first data interface configured for receiving sensor-data generated in response to the intermediary-instruction by a sensor external to the image-processing unit, and a second data interface configured for transmitting to the AP intermediary-data generated by the DSP based on the sensor-data.

12 Claims, 5 Drawing Sheets

(51) Int. Cl.
*G06T 1/00* (2006.01)
*G06T 1/60* (2006.01)
*H04N 5/225* (2006.01)

(52) U.S. Cl.
CPC ............. *G06T 1/60* (2013.01); *H04N 5/2258* (2013.01); *H04N 5/232* (2013.01); *H04N 5/23222* (2013.01)

(58) Field of Classification Search
CPC ......... H04N 5/23222; G06T 1/20; G06T 1/60; G06T 1/0007
See application file for complete search history.

(56) References Cited

U.S. PATENT DOCUMENTS

2010/0302391 A1* 12/2010 Shinozaki .......... H04N 5/23203 348/211.14
2011/0157395 A1* 6/2011 Compton ............... H04N 5/335 348/222.1
2015/0237223 A1* 8/2015 Fung .................. H04N 1/00204 348/207.1
2015/0350504 A1* 12/2015 Corcoran ............. H04N 5/2254 348/211.99
2016/0323524 A1* 11/2016 Smith ................ H04N 5/23245
2018/0330466 A1* 11/2018 Basso ....................... G06T 1/20

* cited by examiner

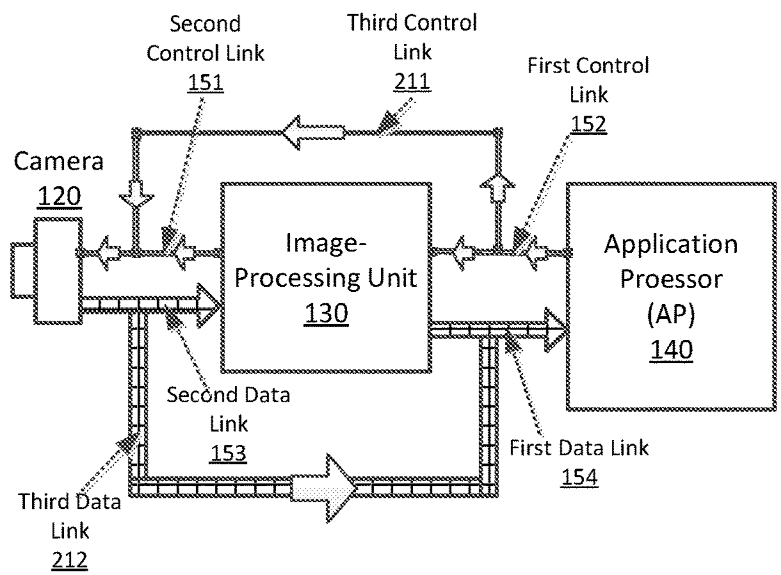
Figure 2-A
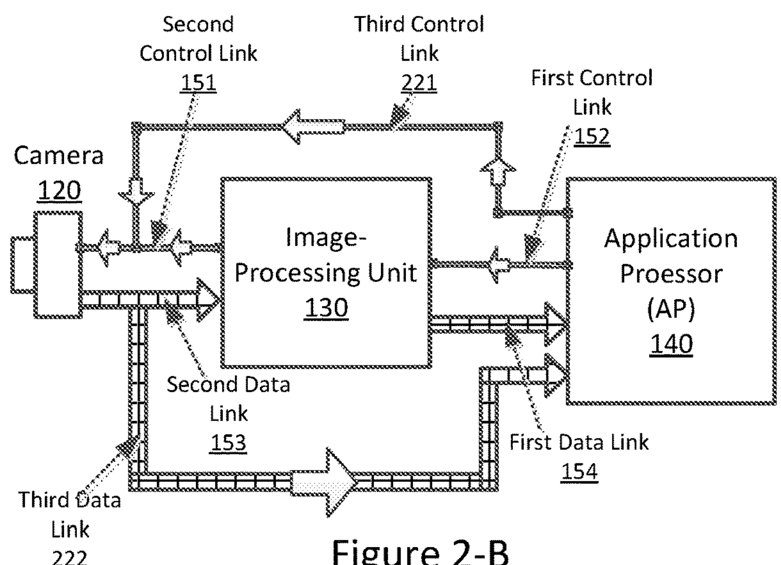
Figure 2-B
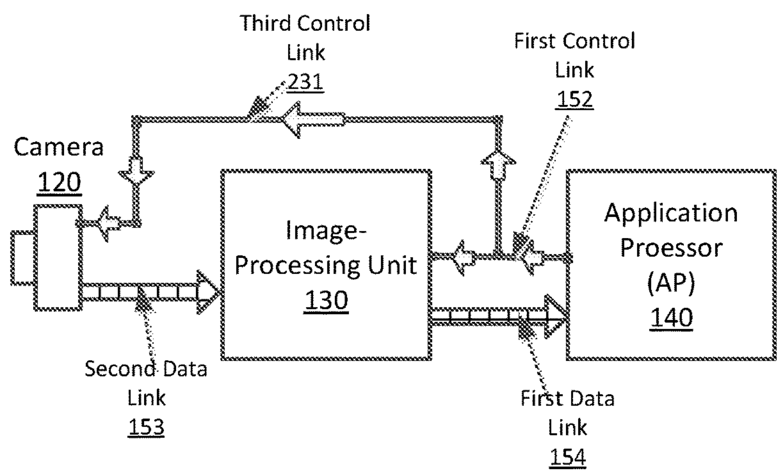
Figure 2-C

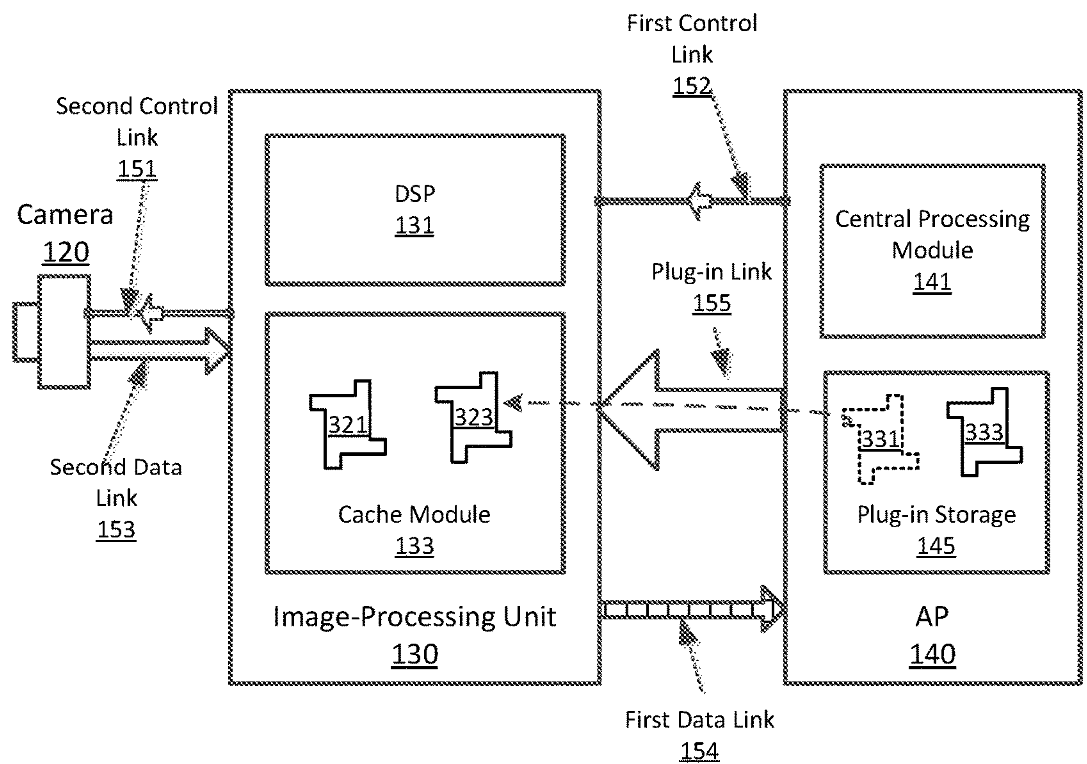
Figure 3-A
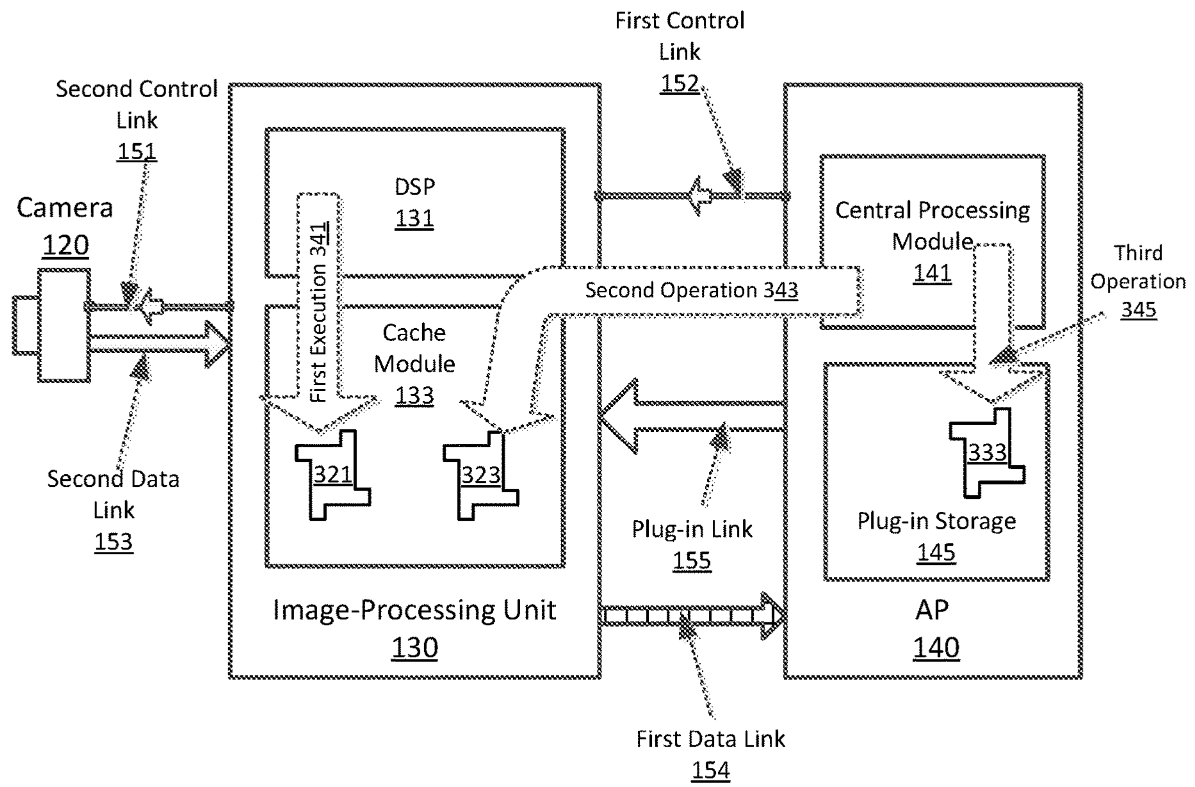
Figure 3-B

IMAGE-PROCESSING MICROPROCESSOR FOR SUPPORTING AN APPLICATION PROCESSOR

CROSS-REFERENCE

This application is a US non-provisional application claiming priority to a Chinese Patent Application No. 201610848517.5, filed on Sep. 26, 2016, and a Chinese Patent Application No. 201611015062.5, filed on Nov. 18, 2016, both of which are hereby incorporated by reference in its entirety, including any appendices or attachments thereof, for all purposes.

TECHNICAL FIELD

The present disclosure is related to an image-processing microprocessor for supporting an application processor, and methods to utilize the image-processing microprocessor to enhance images captured by a camera in response to instructions provided by the application processor.

BACKGROUND

Today's portable electronic devices, such as smartphones, tablets, or wearable electronic devices, are commonly equipped with camera modules, which contain compatible hardware and software modules that allow the portable electronic devices to take photos and videos. As technologies (e.g., pixel resolutions) associated with these camera modules are getting more advanced, consumers' demands for better image qualities in terms of e.g., clarity, color, distortion, are also getting higher. For example, there are increasing demands for portable electronic devices that can produce high-quality images and provide advanced image-capturing capabilities.

In conventional design, the image-processing functionalities of a portable electronic device are often provided by its main application processor (AP). In other words, the AP and the camera module may be directly connected via control links and data links. As all the image-related operations have to be issued by the AP, and all data generated by the camera module have to be processed by the AP, the overall performance of the portable electronic device, as well as its image-processing capabilities, may be restricted by the AP.

BRIEF DESCRIPTION OF THE DRAWINGS

FIG. 2-A shows an electronic device architecture that allows a camera being simultaneously controlled by an image-processing unit and an application processor;

FIG. 2-B shows an electronic device architecture that allows an application processor to independently control both an image-processing unit and a camera;

FIG. 2-C shows an electronic device architecture that allows an application processor to control an image-processing unit and a camera;

FIG. 3-A shows an electronic device architecture configured to perform a plug-in upload operation;

FIG. 3-B shows an electronic device architecture configured to execute a plug-in;

Figure 1:
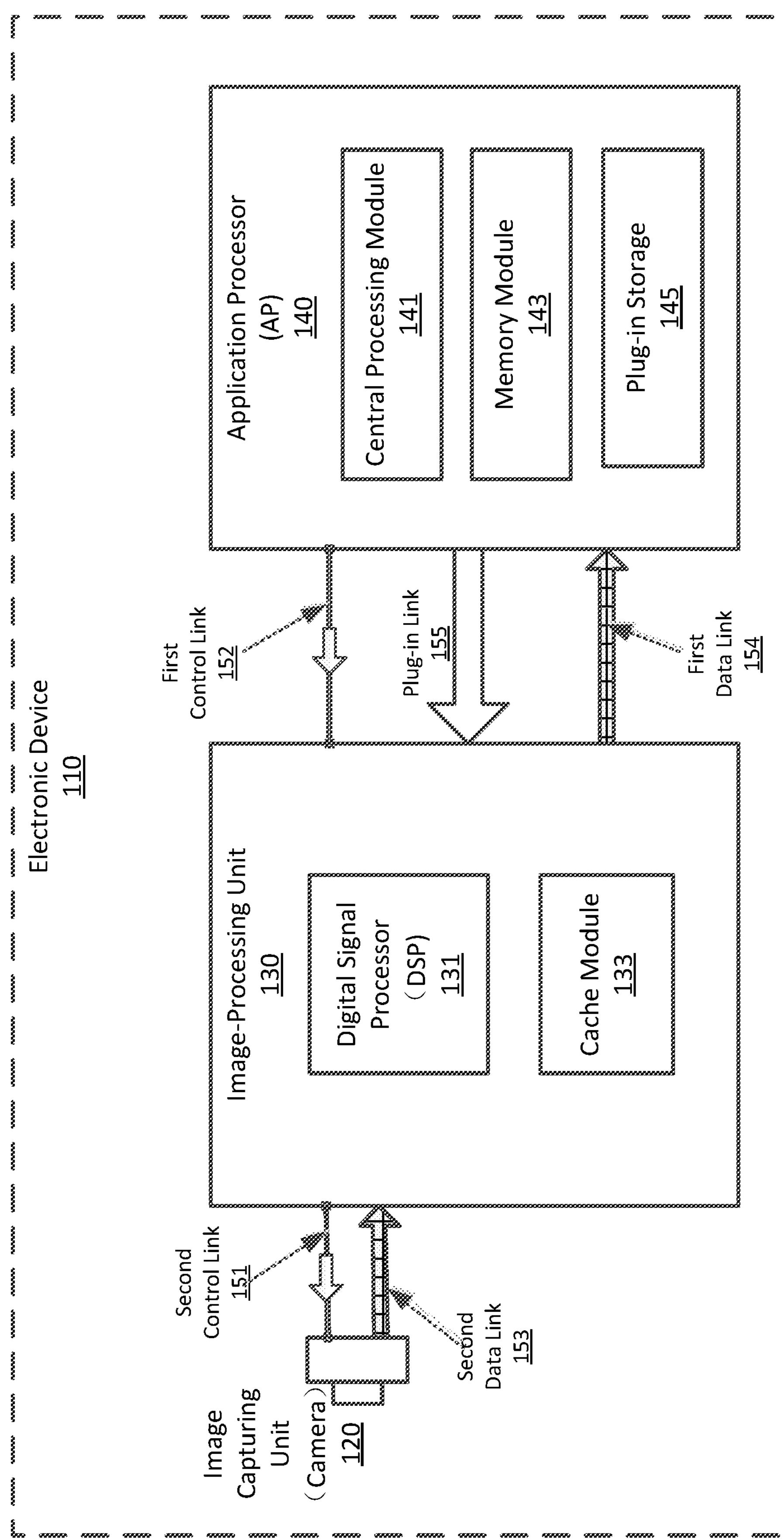
FIG. 1 shows a schematic diagram of an image-processing microprocessor that is configured to connect with a camera and an application processor.

all arranged in accordance to at least one or more embodiments of the present disclosure.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

FIG. 1 shows a schematic diagram of an image-processing microprocessor that is configured to connect with a camera and an application processor, according to the certain embodiments of the present disclosure. The electronic device 110 may be any portable or non-portable electronic device having photographing and/or video-graphing capabilities. The electronic device 110 may typically include mobile phone, smart phone, tablet, laptop, digital camera, video camera, and wearable electronic device such as smart watches, smart wristbands, smart glasses, etc.

In some embodiments, the electronic device 110 may include various hardware modules and electronic components such as image-capturing unit 120, image-processing unit 130, and application processor 140. The image-capturing unit 120 may be an electronic module/component having a function of acquiring an image/video, such as a camera or an image-capturing lens and sensor assembly. The image-capturing unit 120 may receive an external control instruction. In response to the external control instruction, the image-capturing unit 120 may collect or set an image-capturing parameter, adjust its internal optical structure and mechanism based on the image-capturing parameter, and acquire/capture an image/video as image data. In addition, the image-capturing unit 120 may generate and transmit the image data in response to the external control instruction.

In some embodiments, the image-processing unit 130 may be an electronic component capable of controlling the image-capturing unit 120 and processing the control instructions as well as the image/video data. Specifically, the image-processing unit 130 may be configured with an instruction-processing function and a data-processing function. The "instruction-processing function" may refer to the processing of the control instructions for controlling the image-capturing unit 120. The "data-processing function" refers to the processing of image data generated by the image-capturing unit 120, as well as the data provided by the application processor 140.

In some embodiments, the application processor 140 may be an electronic component capable of controlling the image-capturing unit 120 and the image-processing unit 130. As shown in FIG. 1, the image-processing unit 130 may be a microprocessor or computer chip existing separate and independent from the application processor 140. The application processor 140 may be an Application Processor (AP), a Central Processing Unit (CPU), or a System on Chip (SoC). For example, the application processor 140 may be an INTEL® CPU, a QUALCOMM® SoC chip, or a MEDIATEK® SoC chip. In the following description and in figures, the image-capturing unit 120 may simply be referred to as the camera 120, and the application processor 140 may be referred to as the AP 140.

In some embodiments, the image-processing unit 130 may include a digital signal processor 131 and a cache module 133. The digital signal processor 131 may be any hardware component/module having digital data-processing capabilities, such as a Digital Signal Processor (DSP). The cache module 133 may be a hardware storage module (such as flash, RAM, ROM, cache, etc.) that provides various data storages for the image-processing unit 130. The AP 140 may include a central processing module 141, a memory module 143, and optionally a plug-in storage 145. The central processing module 141 may be any hardware module (e.g., CPU, DSP, etc.) having computational processing capabilities. Example of the central processing module 141 may include ARM® core or INTEL® CPU, etc.

In some embodiments, the memory module 143 may be a hardware storage module that provides various data storage functions to the AP 140. The plug-in storage module 145 may be a hardware storage module for storing various plug-ins. The memory module 143 and the plug-in storage module 145 may be implemented using the same or different hardware storage modules. In other words, the memory module 143 and the plug-in storage module 145 may exist in the same storage module or in separate storage modules. For ease of description, the cache module 133 may be referred to as a "first storage module"; the data storage module 143 may be referred to as a "second storage module"; and the plug-in storage module 145 may be referred to as a "third storage module."

In some embodiments, the image-processing unit 130 may be connected with the AP 140 through a first control link 152 and a first data link 154, and the image-processing unit 130 may be connected with the camera 120 through a second control link 151 and a second data link 153. The image-processing unit 130 may further be connected with the AP 140 via a plug-in link 155. In some embodiments, the "control link", "data link", or "plug-in link" may be a wired electronic connection for transmitting electronic signals and data. Specifically, "control link" may refer to an electronic connection for transmitting one or more control instructions for controlling the camera 120; "data link" may refer to an electronic connection for transmitting one or more sets of data associated with the camera 120; and "plug-in link" may refer to an electronic connection for transmitting one or more plug-ins.

In some embodiments, based on various configurations, a link can be designed for one-way (unidirectional) or two-way (bi-directional) transmission. In the unidirectional transmission situation, the first end of the link may be connected to the "transmitting interface" of a first processing unit, and the second end of the link may be connected to the "receiving interface" of a second processing unit. The electronic signal or data may be sent from the transmitting interface of the first processing unit to the first end of the link, and then to the receiving interface of the second processing unit via the second end of the link. In the bidirectional transmission situation, according to the direction of transmission, the transmitting interface may be the interface that transmits data to the link, and the receiving interface may be the interface that receives data from the link.

In some embodiments, multiple electronic connections may form a single control link or a single data link, and multiple control links or data links may also share a common link. Further, one link may be used as a control link for a period of time, and used as a data link in another time period. In the following Figures, the arrows shown on the data links, control links, and plug-in link may indicate the direction of the data transmission through these links.

In some embodiments, the AP 140 may have one or more "instruction-transmitting-interfaces" for transmitting various control instructions and one or more "data-receiving-interfaces" for receiving various data. The camera 120 may have an "instruction-receiving-interface" for receiving various control instructions, and a "data-transmitting-interface" for transmitting various kinds of image data. In some configurations, the AP 140 may be directly connected to the camera 120 via a control link and a data link. In these situations, the control instructions issued by the AP 140 via its instruction-transmitting-interface may be directly transmitted through the control link to the instruction-receiving-interface of the camera 120, and the image data collected by the camera 120 may be directly delivered via its data-transmitting-interface through the data link back to the AP 140 via its data-receiving-interface. In other words, by directly connecting to the camera 120, the AP 140 may be configured to control the camera 120 by transmitting control instructions through the control link, and may receive images captured by the camera 120 via the data link.

In some embodiments, the image-processing unit 130 may be placed between the camera 120 and the AP 140 for processing and transmitting the control instructions sent by the AP 140 and the image data collected by the camera 120. Specifically, the image-processing unit 130 may have one or more "instruction-receiving-interfaces" for receiving control instructions, one or more "instruction-transmitting-interfaces" for transmitting control instructions, one or more "data-receiving-interfaces" for receiving data, and one or more "data-transmitting-interfaces" for sending data. As shown in FIG. 1, the first control link 152 may be connected to the instruction-transmitting-interface of the AP 140 and the instruction-receiving-interface of the image-processing unit 130. The second control link 151 may be connected to the instruction-transmitting-interface of the image-processing unit 130 and the instruction-receiving-interface of the camera 120. The second data link 153 may be connected to the data-transmitting-interface of the camera 120 and the data-receiving-interface of the image-processing unit 130. And the first data link 154 may be connected to the data-transmitting-interface of the image-processing unit 130 and the data-receiving-interface of the AP 140.

In some embodiments, the control instructions generated and/or sent by the AP 140 may be referred to as "AP-instructions" (or "first control instructions"), which include instructions for controlling the camera 120 and for setting and retrieving various image capturing parameters. The AP-instructions may also include instructions for controlling the image-processing functions provided by the image-processing unit 130 and its internal operations. The control instructions generated and sent by the image-processing unit 130 may be regarded as "intermediary-instructions" (or "second control instructions") including instructions for controlling the camera 120 and various image-capturing parameters.

In some embodiments, the image-processing unit 130 may generate the intermediary-instruction in accordance with the AP-instruction. The intermediary-instruction may also include partial or all of one or more AP-instructions, and may include instructions derived from the AP-instructions, instructions generated independent of the AP-instructions, and/or the combinations of above. For example, the image-processing unit 130 may generate an intermediary-instruction for performing various operations such as repetition, copy, add, modify, replace, delete, and the like, or may not generate an intermediary-instruction in view of an AP-instruction received from the AP 140.

In some embodiments, the data generated or transmitted from the camera 120 may be referred to "camera-data" (or "first data"), which may include captured images and the various image-capturing parameters associated with the images. Likewise, the data generated or transmitted from the image-processing unit 130 may be referred to as "intermediary-data" (or "second data"), which may include data derived from the camera-data supplied by the camera 120, and may include data independently generated by the image-processing unit 130.

In some embodiments, the intermediary-data may or may NOT be generated based on the camera-data. For example, the image-processing unit 130 may generate intermediary-data by performing repeating, adding, modifying, deleting, deleting, and the like operations on the camera-data. The intermediary-data may also be independent of the camera-data, e.g., the image-processing unit 130 does not generate the intermediary-data based on the camera-data. In some embodiments, the camera-data includes one or more image frames ("first image"), the image-processing unit 130 may optimize the images, and generates the intermediary-data which also includes one or more image frames ("second image"). The optimization of the first image by the image-processing unit 130 includes operations such as translation, rotation, combining, division, de-noising, and the like. Preferably, the first image and the second image may be in the same format, such as JPG or RAW.

In some embodiments, the AP 140 may transmit an AP-instruction from its instruction-transmitting-interface either to the image-processing unit 130 or to the camera 120. And the data received by the AP 140 through its data-receiving-interface may be from the image-processing unit 130 or from the camera 120. In other words, the AP 140 sends various instructions to the image-processing unit 130 through the first control link 152, as if it sends these instructions directly to the camera 120. And the AP 140 receives various data from the image-processing unit 130 through the first-data link 154, as if the AP 140 receives the data directly from the camera 120. Thus, from the perspective of AP 140, the image-processing unit 130 may be treated as a camera 120. In other words, the image-processing unit 130 may be compatible with a camera 120 in terms of supporting and serving the image capturing and processing requirements of the AP 140.

In some embodiments, the control instructions received by the camera 120 by its instruction-receiving-interface may nevertheless be transmitted from the image-processing unit 130 or the AP 140. And the camera-data sent from the camera 120 through its data-transmitting-interface may be transmitted to the image-processing unit 130 or to the AP 140. Thus, from the perspective of the camera 120, the image-processing unit 130 may be treated as an AP 140. That is, the camera 120 receives various control instructions from the image-processing unit 130 through the second control link 151, or as if it receives these control instructions directly from the AP 140. And the camera 120 sends the camera-data to the image-processing unit 130 through the second data link 153, as if the camera 120 directly sends such camera-data to the AP 140. Therefore, for an electronic device 110 originally designed with an AP 140 and a camera 120 directly connected via a control link and a data link, the image-processing unit 130 may be added into such a design by being connected with the camera 120 and the AP 140 using the control links and data links as illustrated by FIG. 1. The image-processing unit 130 may greatly enhance the electronic device 110's image processing functionalities, in the mean times requiring minimum amount of modifications and producing no impacts to the camera 120 or the AP 140.

In some embodiments, the image-processing unit 130 receives the AP-instruction issued from the AP 140 through the first control link 152, generates an intermediary-instruction according to the AP-instruction, and sends the intermediary-instruction through the second control link 151 to the camera 120. For example, the AP-instruction or the intermediary-instruction may be used to adjust the camera 120's aperture size, shutter speed, exposure parameter, ISO setting, white balance, and may be used to adjust the size of the image to be acquired by the camera 120 or control the camera 120 to capture an image or video. Based on the received AP-instruction or the intermediary-instruction, the camera 120 may manipulate its internal image-capturing mechanisms, and generate the camera-data (which may include one or more captured images, the image parameters, and/or various parameters of the camera 120). Afterward, the camera 120 may transmit the camera-data to the image-processing unit 130 through the second data link 153. The image-processing unit 130 may then generate intermediary-data based on the camera-data, and transmit the intermediary-data to the AP 140 through the first data link 154. The intermediary-data received by the AP 140 via the first data link 154 may be used as a direct response to the AP-instruction sent from AP 140 via the first control link 152.

In some embodiments, in an architecture in which an AP 140 directly connects and controls the camera 120, the AP 140 needs to send an AP-instruction that is fully supported by the camera 120 in order to effectively manipulate the camera 120. Thus, for different models of the camera 120, the AP 140 needs to support multiple versions of AP-instructions corresponding to the different makes and models of the camera 120. In FIG. 1's architecture, the image-processing unit 130 may be configured to provide customized supports to different makes and models of the camera 120, while the AP 140 only needs to issue a standard, generic AP-instruction. In other words, the image-processing unit 130 may translate the generic AP-instruction into different corresponding intermediary-instructions for the different makes and models of the camera 120. In this way, the image-processing unit 130 may help the AP 140 to achieve customized supports of a wider range of makes and models of cameras 120 than the AP 140 by itself.

In some embodiments, the image-processing unit 130 may be configured to assist the AP 140 in controlling the camera 120 with an AP-instruction that is not directly supported by the camera 120. In other words, if the AP 140 transmits such an unsupported AP-instruction directly to the camera 120, the camera 120 may either not understand the AP-instruction or cannot perform the operation as required by the AP-instruction. In FIG. 1's case, the image-processing unit 130 may generate an intermediary-instruction that is supported by the camera 120 based on the unsupported AP-instruction. Afterward, the camera 120 may transmit the camera-data captured based on the intermediary-instruction to the image-processing unit 130, the image-processing unit 130 may process the camera-data, and generate/transmit the intermediary-data to the AP 140 as a response to the AP-instruction. In this way, the image-processing unit 130 may help the AP 140 to support a camera 120 that it cannot support by itself.

In some embodiments, the intermediary-instruction transmitted by the image-processing unit 130 to the camera 120 may be the same as the AP-instruction the image-processing unit 130 received from the AP 140. For example, the AP-instruction issued by the AP 140 may be an instruction to acquire the image-capturing parameters of the camera 120, the image-processing unit 130 may generate an intermediary-instruction (or directly copy the AP-instruction as the intermediary-instruction), and send this intermediary-instruction to the camera 120.

In some embodiments, the image-processing unit 130 may process the AP-instruction issued by the AP 140, and generate an intermediary-instruction that is different from the AP-instruction. For example, the AP-instruction issued by the AP 140 may be an instruction to focus the camera 120. The image-processing unit 130 may generate based on the AP-instruction multiple intermediary-instructions which include instructions that require the camera 120 to adjust the aperture and shutter speed prior to the adjusting of the focus of the camera 120 Thus, the image-processing unit 130 may assist the AP 140 in enhancing the functionalities (such as automatic/semi-automatic aperture adjustment or shutter speed adjustment) of the camera 120, which the AP 140 by itself may not have the capability to provide.

In some embodiments, without the image-processing unit 130 (i.e., the architecture in which the camera 120 and the AP 140 are directly connected), if needs to combine multiple images into a single image, the AP 140 may need to issue multiple AP-instructions to the camera 120, with each of the AP-instructions controlling the camera 120 to capture one corresponding image. After acquired the multiple images according to these AP-instructions, the camera 120 may then transmit these images to the AP 140, for it to perform a combining process to generate a single image from these multiple images. With the help of the image-processing unit 130 in an architecture shown in FIG. 1, the AP 140 only needs to send a single AP-instruction "capturing a multi-image-composed image" to the image-processing unit 130. Even though the camera 120 may NOT directly support such an AP-instruction, the image-processing unit 130 may generate based on this AP-instruction multiple intermediary-instructions, each of which may control the camera 120 to capture a single image. The camera 120 may then capture multiple images after received these intermediary-instructions, and transmit the acquired multiple images to the image-processing unit 130. Afterward, the image-processing unit 130 may then combine/merge the multiple images into a single composition image, and transmit the single composition image to the AP 140 in response to the AP-instruction. In this way, the image-processing unit 130 may help the AP 140 to implement more complex image capturing and processing functions that are not supported by the camera 120.

In some embodiments, the AP 140 may issue a "capturing image" AP-instruction, which may or may not be supported by the camera 120. In this case, without awareness by the AP 140, the image-processing unit 130 may generate multiple intermediary-instructions based on this AP-instruction, in order to control the camera 120 to capture multiple images. After acquired the multiple images according to these intermediary-instructions, the camera 120 may transmit the multiple images to the image-processing unit 130. The image-processing unit 130 may combine these images into one image for noise-reduction or image enhancement, and then transmit the resulting image to the AP 140 as a response to the AP-instruction. In this way, the image-processing unit 130 can not only effectively reduce the burden on the AP 140, but also perform an image processing function that the AP 140 is not aware of.

In some embodiments, the image-processing unit 130 may generate additional control instructions (or "third control instructions") based on the camera-data received from the camera 120. Specifically, the image-processing unit 130 may first generate an intermediary-instruction and send it to the camera 120 after receiving an AP-instruction transmitted from the AP 140. Thereafter, the camera 120 may generate camera-data based on the intermediary-instruction, and transmit the camera-data to the image-processing unit 130 through the second data link 153. Afterward, the image-processing unit 130 may generate one or more third control instructions based on the camera-data supplied from the received camera 120, and transmit the third control instructions to the camera 120 through the second control link 151. The image-processing unit 130 may perform the operation of generating the third control instructions based on the camera-data supplied from the camera 120 and transmitting the third control instructions to the camera 120 multiple times. In this way, the image-processing unit 130 may continue to operate the camera 120 while the AP 140 does not participate.

For example, the image-processing unit 130 may receive from the camera 120 via the second data link 153 certain "image-capturing parameters" as camera-data. The image-capturing parameters may include one or more of the following parameters: aperture setting, shutter setting, exposure setting, ISO setting, white balance, image size, frame rate, as well as other control parameters required for the capturing of an image by the camera 120. Based on these image-capturing parameters, the image-processing unit 130 may generate one or more third control instructions, and send these third control instructions to the camera 120 for adjusting the above image-capturing parameters or capturing image. In this way, the image-processing unit 130 can not only actively set the image-capturing parameters of the camera 120, but also further adjust the camera 120 in accordance with the feedback received from the camera 120 (such as the current light intensity, aperture size, etc.) without requiring the AP 140 to issue any of the controlling instructions.

In some embodiments, the AP 140 may control the operations of the camera 120 without sending any AP-instructions that trigger the image-processing unit 130 to generate the intermediary-instructions. Specifically, based on an assumption or understanding of the needs of the AP 140, the image-processing unit 130 may independently generate one or more intermediary-instructions and transmit them to the camera 120. In other words, without receiving any AP-instructions from the AP 140, the image-processing unit 130 may generate and transmit intermediary-instructions to the camera 120, and the camera 120 may transmit camera-data generated according to the intermediary-instructions back to the image-processing unit 130. The image-processing unit 130 may then generate intermediary-data based on the camera-data, and transmit the intermediary-data to the AP 140.

For example, the electronic device 110 may intend the camera 120 to continue adjusting, in order to keep focusing on a moving subject and providing real-time images (e.g., LiveView function) at all times. In this situation, the image-processing unit 130 may send a sequence of "adjusting focus" intermediary-instructions to the camera 120 at regular intervals without receiving any AP-instruction. Based on this sequence of "adjusting focus" intermediary-instructions, the camera 120 may maintain focus at all time. Every time the focus is readjusted, the camera 120 may quickly generate an image and supply it to the image-processing unit 130. The image-processing unit 130 may then transmit the sequence of images as the intermediary-data to the AP 140 for providing a live view feature on the electronic device 110. Thus, the image-processing unit 130 can further reduce the burden on the AP 140 by improving the AP 140's image acquisition efficiency and optimizing the electronic device 110's overall performance.

In some embodiments, the instruction-processing functions and the data-processing functions of the image-processing unit 130 may be implemented by executing one or more plug-ins provided by the AP 140 in the DSP 131. A "plug-in" may refer to a set of instructions, codes, or programs that may be transmitted via the plug-in link 155, and may be stored in the cache module 133 or the plug-in storage module 145 in software or hardware form. During execution, the DSP 131 may retrieve the plug-ins from the cache module 133, and run/execute the programmed logics contained in the plug-ins to perform its logic and functionalities. This approach may effectively reduce the burden of data processing for the AP 140, improve the image-processing unit 130's image processing efficiency, and optimize the performance of the electronic device 110. In other embodiments, the plug-in may be designed as one or more hardware modules located in the image-processing unit 130 to achieve similar functionalities.

In some embodiments, the AP 140 may have a "plug-in transmitting interface" for transmitting one or more plug-ins, and the image-processing unit 130 may have a "plug-in receiving interface" for receiving the plug-ins. A plug-in link 155, which connects to the plug-in transmitting interface of the AP 140 and the plug-in receiving interface of the image-processing unit 130, may be used to transmit the plug-ins.

In some embodiments, the AP 140 may transfer various control instructions to the image-processing unit 130 through the first control link 152, in order to perform various plug-in operations on the image-processing unit 130. Specifically, the control instructions associated with the plug-ins (or "third control instruction") may include one or more of the following instructions: receiving plug-in, initializing plug-in, or executing plug-in, etc. The various plug-ins may be pre-stored in the plug-in storage 145 of the AP 140, and the AP 140 may perform a "plug-in upload operation" to transfer these plug-ins to the image-processing unit 130. During a startup process, the electronic device 110 may send a start command to the AP 140, which may then perform the plug-in upload operation. Specifically, in the plug-in upload operation, the AP 140 may first send an "receiving plug-in" AP-instruction to the image-processing unit 130 through the first control link 152. Thereafter, the AP 140 may transmit one or more plug-ins retrieved from the plug-in storage module 145 to the image-processing unit 130 through the plug-in link 155.

In some embodiments, after received the plug-ins in the plug-in upload operation, the image-processing unit 130 may store the plug-ins in its own cache module 133 for subsequent initiation. When the image-processing unit 130 or the electronic device 110 is powering down, the various plug-ins stored in the cache module 133 may be cleared. The above approach to upload plug-ins when startup and clear plug-ins when shutdown may effectively reduce the hardware footprints in the image-processing unit 130, and greatly save hardware costs. In addition, the AP 140 may implement the above-described plug-in upload operation to dynamically replace or change any plug-ins during run time.

In some embodiments, the AP 140 may transmit an "initializing plug-in" AP-instruction to the image-processing unit 130 through the first control link 152, and the DSP 131 of the image-processing unit 130 may perform a plug-in initialization process by retrieving plug-ins from the cache module 133 and initializing the image-processing unit 130 based on these plug-ins. In other embodiments, the AP 140 may transmit an "executing plug-in" AP-instruction to the image-processing unit 130 through the first control link 152, and the DSP 131 of the image-processing unit 130 may retrieve the associated plug-ins from the cache module 133 according to the AP-instruction, and execute the logic and functionality contained in the plug-ins.

In some embodiments, the plug-in that the AP 140 transmits to the image-processing unit 130 may include a camera-control plug-in, an image-processing plug-in, a unit control plug, and the like. The "camera-control plug-in" may be a plug-in program to control the camera 120. The "image-processing plug-in" may be a plug-in program for optimizing images acquired by the camera 120. For example, the image-processing plug-in may include a WDR processing plug-in, an HDR processing plug-in, an anti-shaking processing plug-in, or a 3DNR processing plug-in. In other embodiments, the image-processing plug-in may also include an automatic exposure plug-in, an auto white balance plug-in, and an auto focus plug-in. Further, the "unit-control plug-in" may be a plug-in program which can perform certain internal functions (e.g., data retrieving and data manipulating) of the image-processing unit 130.

In some embodiments, the DSP 131 may execute the camera-control plug-in to generate the image-capturing parameters for the camera 120, and transmit the image-capturing parameters to the camera 120 via an intermediary-instruction. Likewise, the DSP 131 may execute the camera-control plug-in to generate an intermediary-instruction based on the AP-instruction. The DSP 131 may also execute an image-processing plug-in to generate an optimized image based on the camera-data provided by the camera 120, and transmits the optimized image to the AP 140 in the form of intermediary-data. The DSP 131's executing of the image-processing plug-in may effectively speed up the image processing speed and improve the image processing efficiency of the image-processing unit 130. The DSP 131 may also execute a unit-control plug-in to implement various internal functions performed by the image-processing unit 130.

In some embodiments, the camera-control plug-in, the image-processing plug-in, and the unit-control plug-in may be executed by the image-processing unit 130 or the AP 140. In other words, the DSP 131 of the image-processing unit 130 and the central processing module 141 of the AP 140 may simultaneously or sequentially execute the plug-ins. In some specific cases, when the image-processing unit 130 is damaged or under heavy load, the AP 140 may execute some of the plug-ins in its own central processing module 141 to take over some of the functions and mitigate the burdens of the image-processing unit 130. For example, the AP 140 may execute the camera-control plug-in to process AP-instruction and generate intermediary-instruction. Thereafter, the AP 140 may transmit the intermediary-instruction to the image-processing unit 130, and instruct the image-processing unit 130 to transmit the intermediary-instruction directly to the camera 120 without any processing. Similarly, the AP 140 may require the image-processing unit 130 to transmit the camera-data acquired from the camera 120 directly to the AP 140 without processing. The AP 140 may then execute the image-processing plug-in in its own central processing module 141, and process the camera-data to generate the intermediary-data for storing in its own memory module 143.

FIG. 2-A shows an electronic device architecture that allows a camera being simultaneously controlled by an image-processing unit and an application processor, according to certain embodiments of the present disclosure. The modules and components in FIG. 2-A may correspond to their respective counterparts in FIG. 1. Specifically, in FIG. 1, the image-processing unit 130 may directly control the camera 120 and directly receive the camera-data the camera 120; and the AP 140 may not directly control the camera 120 and may not directly receive data from the camera 120. In contrast, in FIG. 2-A, the AP 140 and the image-processing unit 130 may both directly control the camera 120, and directly receive the camera-data generated from the camera 120. In addition, the AP 140 and the image-processing unit 130 may cooperate with each other to share the operations of controlling camera 120 and processing the camera-data generated by the camera 120. The term "simultaneous processing" may refer to the separate, concurrent, and/or in-parallel processing of two or more operations that are not depended or related among themselves, and are occurring at the same time or substantially the same time. The term "sequential processing" may refer to the one-by-one processing of multiple operations that are depended or related.

In FIG. 2-A, the image-processing unit 130 may be connected to the AP 140 through the first control link 152 and the first data link 154; the image-processing unit 130 may be connected to the camera 120 through the second control link 151 and the second data link 153. The AP 140 may be further connected to the camera 120 via a third control link 211, and the camera 120 may be further connected to the AP 140 through a third data link 212. In a different embodiment, the third control link 211 and the third data link 212 may both be present, or may have one present with the other one not present/implemented, in the FIG. 2-A.

In some embodiments, the first control link 152 and the third control link 211 may be connected to the instruction-transmitting-interface of the AP 140 and the instruction-receiving-interface of the camera 120 simultaneously; the second control link 151 and the third control link 211 may be simultaneously connected to the data-transmitting-interface of the camera 120 and the data-receiving-interface of the AP 140. In this way, the AP-instruction issued from the AP 140 may be transmitted to the image-processing unit 130 and the camera 120 simultaneously or almost simultaneously through the first control link 152 and the third control link 211 respectively. Likewise, the camera-data from the camera 120 may be transmitted to the image-processing unit 130 and the AP 140 simultaneously or almost simultaneously through the second data link 153 and the third data link 212 respectively.

In some embodiments, the AP 140 and the image-processing unit 130 may be simultaneously involved in the manipulation of the camera 120. In one situation, the AP 140 may transmit an AP-instruction to the camera 120 through the third control link 211, the image-processing unit 130 may generate one or more intermediary-instructions based on the AP-instruction received through the first control link 152, and send the intermediary-instructions to the camera 120 via the second control link 151. Alternatively, the image-processing unit 130 may evaluate the AP-instruction received through the first control link 152 and determine whether or not to coordinate with the AP 140 during the controlling of the camera 120.

In some embodiments, the camera 120 may receive AP-instruction from AP 140 and/or the intermediary-instruction from the image-processing unit 130. Since the image-processing unit 130 may take some time to generate the intermediary-instruction, the camera 120 may first receive the AP-instruction and then the intermediary-instruction with a little delay. The camera 120 may be able to generate the corresponding camera-data and transmit the camera-data to the image-processing unit 130 through the second data link 153, based on the received AP-instruction and the subsequently received intermediary-instruction. The image-processing unit 130 may process and optimize the camera-data, and generate the intermediary-data for transmitting to the AP 140 through the first data link 154 as a response to the AP-instruction.

In some embodiments, the image-processing unit 130 does not participate in the manipulation of the camera 120, and only participate in the processing of the camera-data generated by the camera 120. Specifically, after the image-processing unit 130 receives the AP-instruction via the first control link 152, it does not generate or transmit any intermediary-instruction. In this case, the camera 120 receives only the AP-instruction without the intermediary-instruction, and may generate the corresponding camera-data according to the AP-instruction. The image-processing unit 130 may then process and optimize the camera-data according to the AP-instruction, and generate the intermediary-data for transmitting to the AP 140 through the first data link 154 as a response to the AP-instruction.

In some embodiments, the AP 140 may transmit a "terminate" AP-instruction to the image-processing unit 130 for stopping the image-processing unit 130 from performing some or all of its instruction-processing functions. Once terminated, the image-processing unit 130 may no longer transmit any intermediary-instruction to the camera 120, and the AP 140 can still transmit the AP-instruction to the camera 120 through the third control link 211. In other cases, when the image-processing unit 130 is damaged and its instruction-processing function is disabled, the AP 140 can still control the camera 120 directly through the third control link 211, thereby improving the overall system performance of the electronic device 110.

In some embodiments, both the AP 140 and the image-processing unit 130 may directly receive the camera-data from the camera 120. The image-processing unit 130 may determine whether or not to process the camera-data received from the second data link 153 based on the AP-instruction received through the first control link 152. In some cases, the image-processing unit 130 may generate one or more intermediary-data based on the camera-data, and send the intermediary-data to the AP 140 through the first data link 154. Since the image-processing unit 130 may take time to generate the intermediary-data, the AP 140 may first receive the camera-data and then the intermediary-data with a little delay.

In some embodiments, the image-processing unit 130 does not participate in the processing of the camera-data by the AP 140. Specifically, the image-processing unit 130 may process the camera-data received from the second data link 153, and does not generate the intermediary-data. In this case, the AP 140 will only receive the camera-data without receiving the intermediary-data. In other embodiments, the AP 140 may transmit a "terminate" AP-instruction through the first control link 152 to the image-processing unit 130 for stopping some or all of its data-processing functions. In this way, the image-processing unit 130 no longer transmits any intermediary-data to the AP 140, and the AP 140 can still receive the camera-data transmitted by the camera 120 through the third data link 212. When the image-processing unit 130 is damaged and has some of its data-processing function failed, stopping the data-processing function of the image-processing unit 130 ensures that the AP 140 can still directly receive the camera-data transmitted by the camera 120 through the third control link 212, thereby increasing the electronic device 110 overall system performance.

In some embodiments, the architecture in FIG. 2-A may be adapted by an AP 140 which is designed to control and support a single camera 120. By utilizing the architecture in FIG. 2-A, the image-processing unit 130 can greatly enhance the overall image-processing performance of the electronic device 110, without impacting any existing functions that can be performed by the AP 140 and the camera 120. Specifically, the AP 140 can still control the camera 120 via the third control link 211, and receive camera-data via the third data link 212. By adding the image-processing unit 130, the AP 140 can delegate some of its functions to the image-processing unit 130, in the meantime acquire additional functions that are not previously supported by the AP 140.

FIG. 2-B shows an electronic device architecture that allows an application processor to independently control both an image-processing unit and a camera, according to certain embodiments of the present disclosure. The modules and components in FIG. 2-B may correspond to their respective counterparts in FIG. 1. In FIG. 2-B, the AP 140 may be a processing unit designed to control two cameras 120 (dual-lens). That is, the AP 140 has two instruction-transmitting-interfaces (referred to as a first instruction-transmitting-interface and a second instruction-transmitting-interface), and two data-receiving-interfaces (referred to as a camera-data-receiving-interface and an intermediary-data-receiving-interface) that can be used to directly connect to two cameras 120. In FIG. 2-B, such an AP 140 may achieve flexible dual-control of a camera 120 by incorporating the image-processing unit 130 in lieu of a second camera.

In FIG. 2-B, the image-processing unit 130 may be connected to the AP 140 through the first control link 152 and the first data link 154; the image-processing unit 130 may be connected to the camera 120 through the second control link 151 and the second data link 153. The AP 140 may be further connected to the camera 120 via a third control link 221 that is separated from the first control link 152, and the camera 120 may be further connected to the AP 140 through a third data link 222 that is separated from the first data link 154. In a different embodiment, the third control link 221 and the third data link 222 may both be present, or may have one present with the other one not implemented, in the FIG. 2-B.

In some embodiments, in a dual-command transmission mode, the first instruction-transmitting-interface of the AP 140 may be connected to the first control link 152, and the second instruction-transmitting-interface of the AP 140 may be connected to the third control link 221. The second control link 151 and the third control link 221 may be connected to the instruction-receiving-interface of the camera 120 at the same time. Since the third control link 221 and the first control link 152 are connected to different instruction-transmitting-interfaces, the AP 140 may transmit different control instructions using different links and different approaches as shown below.

In some embodiments, the AP 140 may use the first instruction-transmitting-interface and the first control link 152 to transmit a first AP-instruction, and use the second instruction-transmitting-interface and the third control link 221 to transmit a second AP-instruction. The AP 140 may simultaneously transmit a first AP-instruction and a second AP-instruction that is identical to the first AP-instruction; or simultaneously transmit a first AP-instruction and a second AP-instruction that is different from the first AP-instruction. For example, the AP 140 may send a "shoot video" second AP-instruction to the camera 120, while simultaneously transmitting an "optimize video" first AP-instruction to the image-processing unit 130. While the camera 120 performs video capturing based on the second AP-instruction, the image-processing unit 130 may concurrently or in-parallel generate, based on the first AP-instruction, a set of image-capturing parameters that can be used to optimize the captured video. Afterward, the image-processing unit 130 may embed these image-capturing parameters into the intermediary-instruction, and send it to the camera 120 through the second control link 151. The camera 120 may then adjust its configurations while performing the video capturing process in parallel.

In some embodiments, the AP 140 may sequentially transmit the same or different first and second AP-instructions. In other words, the AP 140 may first transmit a first AP-instruction, and then transmit a second AP-instruction, or vice versa. For example, the AP 140 may first send an "optimize image" first AP-instruction to the image-processing unit 130, and then send a "capture image" second AP-instruction to the camera 120. The image-processing unit 130 may generate and transmit an intermediary-instruction (e.g., "turn on the optical image stabilization") to the camera 120 according to the received "optimize image" AP-instruction, and the camera 120 may first turn on its optical image stabilizing function before capturing images in response to the "capture image" AP-instruction.

In some embodiments, when the AP 140 sends a first AP-instruction to the image-processing unit 130 and a second AP-instruction to the camera 120, the image-processing unit 130 may determine whether to participate and how to participate in the control of the camera 120 based on the first AP-instruction it receives. Specifically, the image-processing unit 130 may select not to generate an intermediary-instruction based on the first AP-instruction, or alternatively generate one or more intermediary-instructions and pass the intermediary-instructions through the second control link 151 to the camera 120. Afterward, for the camera-data received from the camera 120, the image-processing unit 130 may determine whether or not to process, and how to process the camera-data to generate the intermediary-data, in according to the first AP-instruction.

In some embodiments, the AP 140 may send a second AP-instruction directly to the camera 120 via the third control link 221 without sending any first AP-instruction to the image-processing unit 130 via the first control link 152. In this case, the AP 140 directly controls the camera 120 and performs image acquisition without the image-processing unit 130's involvement. And the camera-data provided by the camera 120 may be transmitted to the image-processing unit 130 through the second data link 153. When the image-processing unit 130 receives the camera-data transmitted by the camera 120 without knowing the first AP-instruction, it can ignore it or directly transmit the camera-data to the AP 140 through the first data link 154. Alternatively, the image-processing unit 130 may generate intermediary-data based on the camera-data using its best knowledge, and then transmit the intermediary-data to the AP 140.

In some embodiments, the AP 140 may receive camera-data from the camera 120 via the third data link 222, and receive intermediary-data from the image-processing unit 130 via the first data link 154. Thus, the AP 140 may have various options to process the camera-data and the intermediary-data. For example, the AP 140 may ignore the camera-data or the intermediary-data, compare the camera-data with the intermediary-data, or process the camera-data and the intermediary-data to generate additional data.

In some embodiments, the architecture in FIG. 2-B may be adapted by an AP 140 which is designed to control and support two cameras 120. By utilizing the architecture in FIG. 2-B, the AP 140 may treat the image-processing unit 130 as one of the two cameras 120, and can utilize the image-processing unit 130 to greatly enhance the overall image-processing performance of the electronic device 110. Specifically, the AP 140 can directly control the camera 120 via the third control link 221, and receive camera-data via the third data link 212. The AP 140 can also simultaneously control the image-processing unit 130, and utilize the image-processing unit 130 to perform some of its own functions or additional functions that are not supported by the AP 140.

FIG. 2-C shows an electronic device architecture that allows an application processor to control an image-processing unit and a camera, according to certain embodiments of the present disclosure. The modules and components in FIG. 2-C may correspond to their respective counterparts in FIG. 1. In comparison to FIG. 1, the architecture shown in FIG. 2-C eliminates the second control link 151 that connects the image-processing unit 130 with the camera 120, but adds the third control link 231 connecting the AP 140 with the camera 120. Such an approach may be suitable for an existing architecture design in which the AP 140 may be connected to the camera 120 via a control link and a data link. The new architecture design in FIG. 2-C may allow the addition of an image-processing unit 130 with minimum amount of adjustment to the existing architecture design. Specifically, the new architecture design only needs to join the image-processing unit 130 and the first control link 152 of the existing architecture design. The control link in the existing architecture design may be deemed the third control link 231 in the FIG. 2-C. In addition, the data link in the existing architecture design may be separated to be the second data link 153 and the first data link 154 in FIG. 2-C. Under the above modifications of the existing architecture design, the functions of the camera 120 and the AP 140 are not affected but enhanced with the additional image-processing functionalities provided by the image-processing unit 130.

In some embodiments, the AP 140 may pass the AP-instruction to the image-processing unit 130 and the camera 120 through the first control link 152 and the third control link 231. The image-processing unit 130 does not participate in the direct control of the camera 120, only to participate in the processing of the camera-data generated by the camera 120. For example, the AP 140 may transmit an AP-instruction including the image-capturing parameters to the camera 120 through the third control link 231. After the camera 120 captured an image based on the image-capturing parameters and transmitted the image to the image-processing unit 130 through the second data link 153, the image-processing unit 130 may optimize the image based on the AP-instruction received from the first control link 152, and send the optimized image to the AP 140 through the first data link 154.

FIG. 3-A shows an electronic device architecture configured to perform a plug-in upload operation, according to certain embodiments of the present disclosure. The modules and components in FIG. 3-A may correspond to their respective counterparts in FIG. 1. As shown in FIG. 3-A, the plug-in storage module 145 of the AP 140 may store the plug-in 331 and the plug-in 333. And the cache module 133 of the image-processing unit 130 may store the plug-in 321. In some embodiments, the AP 140 may perform a plug-in upload operation to transmit the plug-in 331 to the image-processing unit 130.

In some embodiments, the AP 110 may transmit an AP-instruction "receiving plug-in" to the image-processing unit 130 through the first control link 211. Thereafter, the AP 110 may transmit the plug-in 331 originally stored in the plug-in storage module 145 to the image-processing unit 130 through the plug-in link 155. After the image-processing unit 130 receives the plug-in 331 through the plug-in link 155 in response to the AP-instruction, the image-processing unit 130 may store the plug-in 331 in the cache module 133 as the plug-in 323. That is, the plug-in 331 and the plug-in 323 are the same plug-in before and after the plug-in upload operation. Similarly, the plug-in 321 in the cache module 133 may be transmitted to the image-processing unit 130 via a previous plug-in upload operation. After the plug-in upload operation is completed, the AP 140 may clear the plug-in 331 from the plug-in storage module 145, leaving only the plug-in 333 in the plug-in storage module 145.

In some embodiments, the AP 140 may perform the plug-in upload operation described above after receiving a start command during an initialization operation. The "start command" may be an instruction to start the camera 120 or start the image-processing unit 130. For example, the AP 110 may upload the unit-control plug-in during its initialization to provide the logical functions required for the internal operation of the image-processing unit 130. When the electronic device 110 is about to utilize the camera 120, the electronic device 110 may transmit a start command to the AP 140, for it to dynamically upload the camera-control plug-in to the image-processing unit 130. The camera-control plug-in may provide the logic function required by the image-processing unit 130 to manipulate the camera 120. Alternatively, the AP 140 may upload to the image-processing unit 130 an image-processing plug-in, which provides the logic function to process the camera-data and generate the intermediary-data.

FIG. 3-B shows an electronic device architecture configured to execute a plug-in, according to certain embodiments of the present disclosure. The modules and components in FIG. 3-B may correspond to their respective counterparts in FIG. 1. As shown in FIG. 3-A, the image-processing unit 130 may utilize its DSP 131 to execute the plug-in 321 in the cache module 133. The AP 140 may utilize its central processing module 141 to execute the plug-in 333 in the plug-in storage module 145. And the image-processing unit 130 and the AP 140 may co-operate in the executing of the plug-in 3223 in the cache module 133. Assuming that the plug-in 321 is an image-processing plug-in, the image-processing unit 130 may receive a first image acquired by the camera 120 through the second data link 153, and the DSP 131 may execute the first operation 341 to run the image-processing plug-in 321. During execution of the first run operation 241, the DSP 131 may perform the optimization process by running the instructions, codes, and programs in the image-processing plug-in 221, in order to generate a second image.

In some embodiments, the AP 140 may perform a second operation 343 to execute the plug-in 323 in the cache module 133 by controlling the image-processing unit 130. During execution of the second operation 343, the AP 140 may first send an "executing plug-in" AP-instruction to the image-processing unit 130 via the first control link 152. Based on the AP-instruction, the DSP 131 may retrieve the image-processing plug-in 323 from the cache module 133, and execute the instructions, codes, and programs in the image-processing plug-in 323. In other embodiments, the cache module 133 may store multiple image-processing plug-ins 323 (e.g., adjusting exposure plug-in, adjusting focus plug-in, adjusting contrast plug-in, etc.). In this case, the AP 140 may send another AP-instruction to the image-processing unit 130 for selecting one or more of the image-processing plug-ins 323. The DSP 131 may then sequentially execute the selected image-processing plug-ins 323 to perform multiple rounds of processing on the first image.

In some embodiments, the central processing module 141 of the AP 140 may also execute the plug-ins stored in the plug-in storage 145 to process the received second image. For example, the image-processing unit 130 may transmit the second image (generated after optimizing the first image) to the AP 140 through the first data link 154. During the execution of the third operation 345, the AP 140 may retrieve the image-processing plug-in 333 from the plug-in storage module 145, and instruct the central processing module 141 (or any DSP contained in the AP 140) to execute the instructions, code, and programs in the image-processing plug-in 333 and process the second image.

In some embodiments, the AP 140 may design an "image-processing workflow" that utilizes both the image-processing unit 130 and the AP 140 simultaneously or sequentially. For example, the image-processing workflow may include the following operations: performing color optimization using the image-processing plug-in 321, performing noise reduction using the image-processing plug-in 323, and performing editing process using the image-processing plug-in 333. In this case, the image-processing unit 130 may first use the DSP 131 to execute the image-processing plug-in 321 and perform color optimization on the first image. Thereafter, the image-processing unit 130 may transmit a processing result to the AP 140 through the first data link 154. Based on the processing, the AP 140 may send an AP-instruction which requires the image-processing unit 130 to execute the image-processing plug-in 323 to further perform noise reduction on the color-optimized first image. Afterward, the image-processing unit 130 may transmit the noise-reduced second image to the AP 140 through the first data link 154, and the AP 130 may execute the image-processing plug-in 333 through its central processing module 141 to complete the editing process on the received second image.

Figure 4:
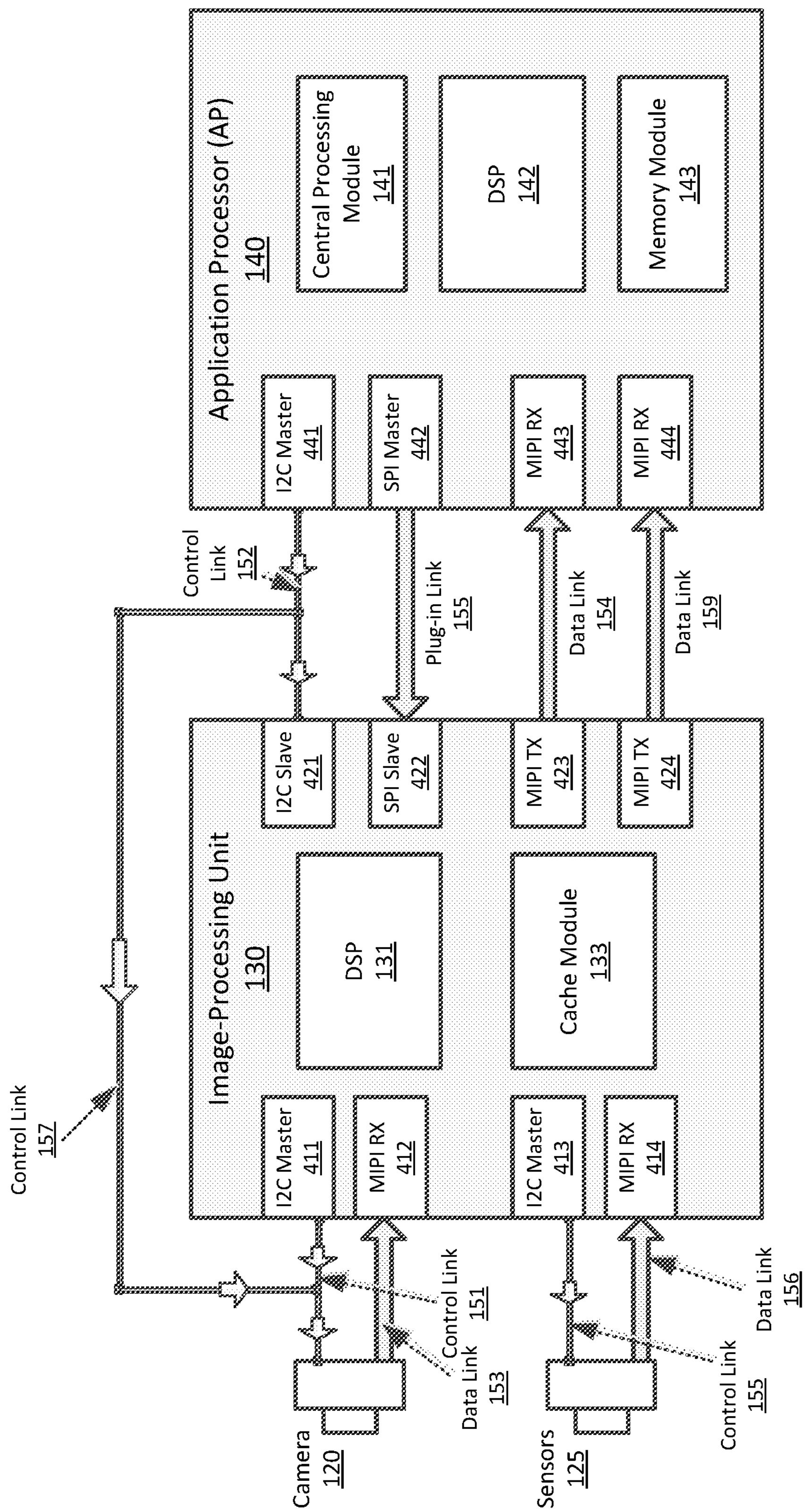
FIG. 4 shows a schematic view of an image-processing unit.

FIG. 4 shows a schematic view of an image-processing unit, according to certain embodiments of the present disclosure. The modules and components in FIG. 4 may correspond to their respective counterparts in FIG. 1. In FIG. 4, the image-processing unit 130 may include a control interface 421 for receiving AP-instructions from an AP 140, and a data interface 422 for receiving plug-ins from the AP 140. The image-processing unit 130 may also include a control interface 411 for transmitting intermediary-instructions to a camera 120, and a data interface 412 for receiving camera-data from the camera 120. Further, the image-processing unit 130 may include a control interface 413 for transmitting intermediary-instructions to another sensor 125, and a data interface 414 for receiving sensor-data from the sensor 125. The image-processing unit 130 may then process the camera-data and the sensor-data, and transmit the processed data via a data interface 423 and the data interface 424 to the AP 140.

In some embodiments, the AP 140 may include a control interface 441 for transmitting AP-instructions to the image-processing unit 130 (via control link 152) or the camera 120 (via control link 157), and a data interface 442 for transmitting plug-ins to the image-processing unit 130. The AP 140 may also include a data interface 443 for receiving intermediary-data (or camera-data) associated with the camera 120, and a data interface 444 for receiving intermediary-data (or sensor-data) from the sensors 125. Further, the image-processing unit 130 may also include a DSP 142 that is similar to the DSP 131 of the image-processing unit 130.

In some embodiments, the image-processing unit 130 of FIG. 4 may be configured to support multiple cameras 120 and sensors 125, even if the AP 140 can by itself only support one or two cameras 120 or sensors 125. Specifically, the sensors 125 may be any electronic components, modules, or subsystems that can detect environmental events or changes and generate sensor-data based on the detected events or changes. For example, the sensors 125 may include another camera which has the same or different make and model compared to the camera 120, temperature sensor, acceleration sensor, light sensor, motion sensor, sound sensor, pressure sensor, humidity sensor, magnetic field sensor, electrical field sensor, and biochemical sensor, etc. The image-processing unit 130 may be configured to transmit an intermediary-instruction to the sensors 125 via a control link 155, process the sensor-data received from the sensors 125 via a data link 156, and provide intermediary-data to the AP 140 for further processing via data links 154 and 159. Thus, an AP 140 that does not support any of the above sensors 125 may nevertheless interact with these sensors by incorporating the help of the image-processing unit 130. In some instances, the image-processing unit 130 may be pre-configured with the functionalities to process the sensor-data, or the AP 140 may dynamically upload to the image-processing unit 130 plug-ins that can provide such processing functionalities.

In some embodiments, with the supports of the image-processing unit 130, the AP 140 may nevertheless be configured to transmit an AP-instruction directly to the camera 120 via control link 157 without utilizing the image-processing unit 130. Further, the AP 140 may or may not be configured to simultaneously transmit a first AP-instruction to the first camera 120 and a second AP-instruction to the sensors 125. Also, the AP may be configured to transmit one AP-instruction directly to the camera 120 via control link 157, simultaneous to the transmitting of another AP-instruction to the image-processing unit 130. In other embodiments, the AP 140 may be configured to receive camera-data directly from the camera without utilizing the image-processing unit 130, or receive camera-data directly from the camera simultaneous to the receiving of the intermediary-data from the image-processing unit 130.

In some embodiments, when the image-processing unit 130 is connected with two or more cameras 120, the image-processing unit 130 may generate multiple identical or different intermediary-instructions for these cameras 120 based on the same AP-instruction provided by the AP 140. The image-processing unit 130 may simultaneously transmit these multiple intermediary-instructions to their respective cameras 120. Further, the image-processing unit 130 may receive a set of camera-data from these cameras 120 in response to the intermediary-instructions, and generate intermediary-data based on these set of camera-data. Afterward, the image-processing unit 130 may transmit the intermediary-data to the AP in response to the AP-instruction. In some embodiments, the AP 140 is not configured to simultaneously transmit the AP-instruction each of the cameras 120.

Figure 5:
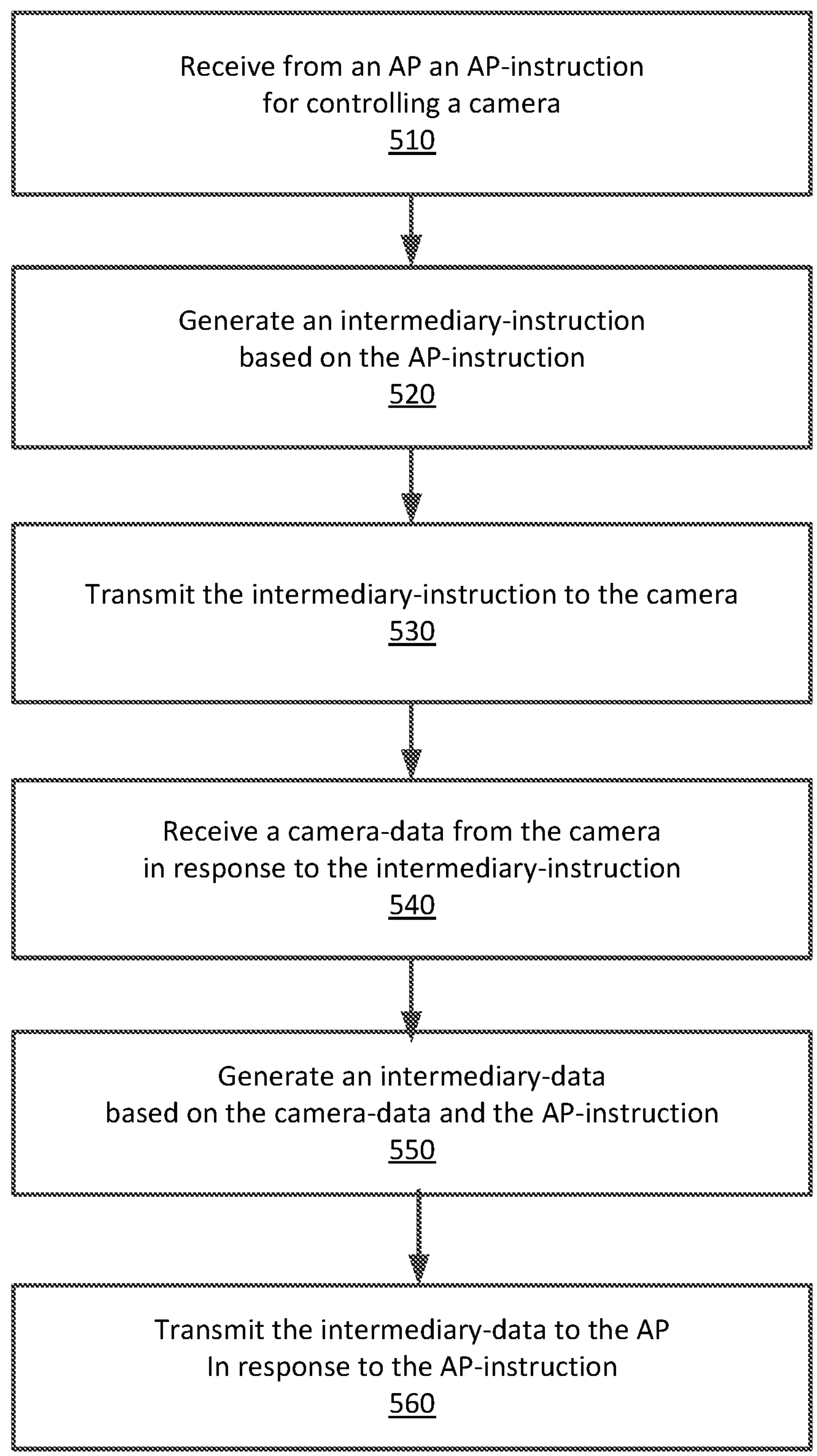
FIG. 5 shows a flow diagram illustrating a process for providing image-processing functionality to an electronic device.

FIG. 5 shows a flow diagram illustrating a process for providing image-processing functionality to an electronic device, in accordance to certain embodiments of the present disclosure. The process sets forth various functional blocks or actions (as shown in e.g., 510, 520, and 530 etc.) that may be described as processing steps, functional operations, events, and/or acts, which may be performed by hardware, software, and/or firmware. Those skilled in the art in light of the present disclosure will recognize that numerous alternatives to the functional blocks shown in FIG. 3 may be practiced in various implementations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At block 510, an image-processing unit of the electronic device may receive, from an application processor (AP) in the electronic device, an AP-instruction for controlling a camera in the electronic device. In some embodiments, the camera may or may not support the AP-instruction.

At block 520, the image-processing unit may generate an intermediary-instruction based on the AP-instruction. In some embodiments, the intermediary-instruction may be the same as or different from the AP-instruction. Further, the camera may support the intermediary-instruction. Further, the image-processing image may execute a plug-in to process the AP-instruction and generate the intermediary-instruction.

In some embodiments, the image-processing unit may generate a plurality of control instructions as the intermediary-instruction. Specifically, each of the plurality of control instructions may be configured to control the camera in performing a corresponding operation. For example, each of the plurality of control instructions may control the camera to capture a corresponding image.

At block 530, the image-processing unit may transmit the intermediary-instruction to the camera. From the perspective of the camera, the image-processing unit may act as the AP.

At block 540, the image-processing unit may receive a camera-data from the camera in response to the intermediary-instruction. In some embodiments, the image-processing unit may receive a plurality of images generated by the camera in response to the plurality of control instructions in the intermediary-instruction.

At block 550, the image-processing unit may generate an intermediary-data based on the camera-data and the AP-instruction. In some embodiments, the intermediary-data, which may include a single image, may be generated based on the plurality of images. Further, the image-processing unit may utilize a DSP to execute a plug-in to generate the intermediary-data.

At block 560, the image-processing unit may transmit the intermediary-data to the AP in response to the AP-instruction. From the perspective of the AP, the intermediary-data may be deemed as if the AP transmitted the AP-instruction to the camera and received the intermediary-data from the camera.

Systems and methods for utilizing an image-processing unit to support an application processor have been disclosed. The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like. One or more embodiments of the present disclosure may be implemented as one or more computer programs or as one or more computer program modules embodied in one or more computer readable media. The term computer readable storage medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, modules and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. An electronic device, comprising:

a first camera;

an application processor (AP); and an image-processing unit coupled with the first camera and the AP, wherein the image-processing unit is configured to receive a first AP-instruction from the AP for controlling the camera, generate a first intermediary-instruction based on the first AP-instruction, transmit the first intermediary-instruction to the first camera, receive a first camera-data from the first camera in response to the first intermediary-instruction, generate a first intermediary-data based on the first camera-data and the first AP-instruction, and transmit the first intermediary-data to the AP in response to the first AP-instruction, and the AP is configured to transmit the first AP-instruction directly to the first camera without utilizing the image-processing unit.

2. The electronic device as recited in claim 1, wherein the AP is not configured to simultaneously transmit the first AP-instruction to the first camera and to the image-processing unit.

3. The electronic device as recited in claim 1, wherein the AP is configured to transmit a second AP-instruction directly to the first camera simultaneous to the transmitting of the first AP-instruction to the image-processing unit.

4. The electronic device as recited in claim 3, wherein the second AP-instruction is different from the first AP-instruction.

5. The electronic device as recited in claim 1, wherein the AP is configured to receive the first camera-data directly from the first camera without the image-processing unit.

6. The electronic device as recited in claim 1, wherein the AP is configured to receive the first camera-data directly from the first camera simultaneous to the receiving of the first intermediary-data from the image-processing unit.

7. The electronic device as recited in claim 1, further comprising:

a second camera coupled with the image-processing unit, wherein the image-processing unit is further configured to:

generate a second intermediary-instruction based on the first AP-instruction, transmit the second intermediary-instruction to the second camera simultaneous to the transmitting of the first intermediary-instruction to the first camera, receive a second camera-data from the second camera in response to the second intermediary-instruction, generate a second intermediary-data based on the second camera-data and the first AP-instruction, and transmit the second intermediary-data to the AP in response to the first AP-instruction.

8. The electronic device as recited in claim 7, wherein the AP is not configured to simultaneously transmit the first AP-instruction to the first camera and to the second camera.

9. The electronic device as recited in claim 7, wherein the first AP-instruction is different from the second AP-instruction.

10. The electronic device as recited in claim 7, wherein the image-processing unit further generates the second intermediary-data based on the first intermediary-data.

11. An electronic device, comprising:

a first camera;

an application processor (AP); and an image-processing unit coupled with the first camera and the AP, wherein the image-processing unit is configured to receive a first AP-instruction from the AP for controlling the camera, generate a first intermediary-instruction based on the first AP-instruction, transmit the first intermediary-instruction to the first camera, receive a first camera-data from the first camera in response to the first intermediary-instruction, generate a first intermediary-data based on the first camera-data and the first AP-instruction, and transmit the first intermediary-data to the AP in response to the first AP-instruction, and the AP is configured to transmit a second AP-instruction directly to the first camera simultaneous to the transmitting of the first AP-instruction to the image-processing unit.

12. The electronic device as recited in claim 11, wherein the second AP-instruction is different from the first AP-instruction.

* * * * *